United States Patent
Jain et al.

(10) Patent No.: US 9,772,963 B2
(45) Date of Patent: Sep. 26, 2017

(54) INTERRUPT MANAGEMENT SYSTEM FOR DEFERRING LOW PRIORITY INTERRUPTS IN REAL-TIME SYSTEM

(71) Applicant: FREESCALE SEMICONDUCTOR, INC., Austin, TX (US)

(72) Inventors: Priyanka Jain, Ashok Vihar (IN); Girraj K. Agrawal, Noida (IN); Rajan Srivastava, Noida (IN)

(73) Assignee: NXP USA, INC., Austin, TX (US)

( * ) Notice: Subject to any disclaimer, the term of this patent is extended or adjusted under 35 U.S.C. 154(b) by 220 days.

(21) Appl. No.: 14/809,269

(22) Filed: Jul. 26, 2015

(65) Prior Publication Data
US 2017/0024342 A1    Jan. 26, 2017

(51) Int. Cl.
G06F 13/00 (2006.01)
G06F 13/32 (2006.01)
G06F 9/48 (2006.01)

(52) U.S. Cl.
CPC ............ *G06F 13/32* (2013.01); *G06F 9/4825* (2013.01)

(58) Field of Classification Search
CPC ............................... G06F 13/32; G06F 9/4825
See application file for complete search history.

(56) References Cited

U.S. PATENT DOCUMENTS

| | | | | |
|---|---|---|---|---|
| 4,777,591 A * | 10/1988 | Chang | ................... | G06F 13/128 710/119 |
| 5,535,380 A * | 7/1996 | Bergkvist, Jr. | .......... | G06F 13/24 710/266 |
| 5,889,973 A * | 3/1999 | Moyer | ................... | G06F 9/4812 710/260 |
| 5,905,913 A | 5/1999 | Garrett et al. | | |
| 6,378,022 B1 * | 4/2002 | Moyer | ................... | G06F 9/3836 710/260 |
| 6,421,702 B1 * | 7/2002 | Gulick | ................... | G06F 9/4812 712/225 |
| 6,466,962 B2 * | 10/2002 | Bollella | ............. | G06F 9/45533 718/104 |
| 8,191,085 B2 * | 5/2012 | Moyer | ............... | G06F 9/30043 712/224 |
| 2002/0078121 A1 * | 6/2002 | Ballantyne | ............ | G06F 9/4812 718/102 |

(Continued)

*Primary Examiner* — Jing-Yih Shyu
(74) *Attorney, Agent, or Firm* — Charles E. Bergere

(57) ABSTRACT

An interrupt management system for managing multiple interrupts includes a timer and an interrupt management sub-system. The interrupt management sub-system receives first and second interrupts, determines the first interrupt to be a real-time interrupt and the second interrupt to be a non-real-time interrupt, initializes the timer for a predetermined time period on reception of the first interrupt, and determines whether the second interrupt is either a maskable or non-maskable interrupt. The interrupt management sub-system transmits the first interrupt to an interrupt controller, enqueues the second interrupt during the predetermined time period, and transmits the second interrupt to the interrupt controller after the predetermined time period when the second interrupt is a maskable interrupt. The interrupt management sub-system transmits the second interrupt to the interrupt controller during the predetermined time period when the second interrupt is a non-maskable interrupt.

11 Claims, 6 Drawing Sheets

(56) References Cited

U.S. PATENT DOCUMENTS

| | | | | |
|---|---|---|---|---|
| 2002/0161961 A1* | 10/2002 | Hardin | ............... | G06F 13/24 |
| | | | | 711/6 |
| 2006/0117316 A1* | 6/2006 | Cismas | ............. | G06F 9/3851 |
| | | | | 718/103 |
| 2012/0110388 A1* | 5/2012 | Lavery | ............. | G06F 11/0757 |
| | | | | 714/47.1 |

* cited by examiner

INTERRUPT MANAGEMENT SYSTEM FOR DEFERRING LOW PRIORITY INTERRUPTS IN REAL-TIME SYSTEM

BACKGROUND

The present invention generally relates to computing systems, and, more particularly, to an interrupt management system for a computing system.

Computing systems include a processor, multiple peripheral devices connected to the processor, and an interrupt controller connected between the peripheral devices and the processor. Examples of such computing systems include computer systems, consumer electronic devices, and communication network elements.

The peripheral devices generate multiple interrupts and corresponding interrupt signals that indicate occurrences of events to be serviced by the processor. The interrupt controller receives the interrupt signals and transmits them to the processor. Interrupts are of two types—real-time and non-real-time interrupts. A real-time interrupt is a time-critical interrupt. Generally, the real-time interrupt is a high-priority interrupt and must be serviced by the processor within a predetermined time period. Non-real-time interrupts include maskable and non-maskable interrupts. A maskable interrupt is a low priority interrupt and a non-maskable interrupt is a high-priority interrupt. A non-maskable interrupt has higher priority than a real-time interrupt.

When the processor receives a real-time interrupt signal, the processor executes an interrupt service routine (ISR) corresponding to the real-time interrupt and a non-ISR program corresponding to the real-time interrupt (collectively referred to as "real-time program"). The ISR and the non-ISR program, both corresponding to the real-time interrupt, must be executed by the processor within the predetermined time period. When the processor receives a non-real-time interrupt signal corresponding to a non-real-time interrupt, the processor executes an ISR and a non-ISR, both corresponding to the non-real-time interrupt (collectively referred to as "non-real-time program").

When the processor receives the non-real-time interrupt signal during the execution of the real-time program, the processor suspends the execution of the non-ISR program corresponding to the real-time interrupt and executes the ISR corresponding to the non-real-time interrupt. The processor resumes the execution of the real-time program after executing the ISR corresponding to the non-real-time interrupt, thereby delaying execution of the real-time program. Further, the processor may receive multiple non-real-time interrupt signals during the predetermined time period. Hence, the processor may fail to complete the execution of the real-time program within the predetermined time period, which reduces the efficiency of the computing system.

For example, if the processor is part of an eNode-B, then the processor executes a layer-2 (L2) stack of a long term evolution (LTE) communication system protocol. The processor is connected to multiple peripheral devices, such as a universal serial bus (USB) port, a universal asynchronous receiver/transmitter (UART), and a serial peripheral interface (SPI) bus. The eNode-B further includes an antenna interface controller (AIC) that generates a periodic real-time interrupt. The periodic real-time interrupt is referred to as transmission time interval (TTI) signal and the time period of the TTI signal is the transmission time interval (TTI) window. The processor receives the TTI signal and executes a real-time program corresponding to the TTI signal. The processor must finish the execution of the real-time program, e.g., the LTE L2 stack, within the TTI window. Failure to finish the execution of the real-time program within the TTI window results in to an LTE protocol violation. Further, the other peripheral devices may generate non-real-time interrupts, which are sent to the processor. When the processor receives a non-real-time interrupt during execution of the real-time program, the processor suspends execution of the real-time program indicated by the TTI signal. Further, the processor executes an ISR corresponding to the non-real-time interrupt. The processor resumes execution of the real-time program after execution of the non-real-time interrupt ISR. This delays completion of the real-time program, which increases the probability of an LTE protocol violation.

One known technique to overcome the probability of a protocol violation includes use of a real-time interrupt period (RTIP) counter and multiple safe-period counters. The RTIP counter stores an RTIP value and generates a real-time interrupt signal after a time period indicative of the stored RTIP value. Similarly, each safe-period counter stores a safe-period value and generates a safe-period signal after the time period indicative of the stored safe-period value. Further, each safe-period signal corresponds to a non-real-time program. The processor receives the safe-period signals and suspends execution of corresponding non-real-time programs. The processor then receives the real-time interrupt signal and executes an ISR corresponding to the real-time interrupt. The processor then resumes the non-real-time programs after receiving the real-time interrupt signal and re-initializes the RTIP and safe-period counters. Hence, the technique suppresses the non-real-time programs before the generation of the real-time interrupt signal. However, the technique does not reduce interference of the non-real-time interrupts during the execution of the real-time interrupt ISR.

In another known technique, where multiple interrupts are generated by a peripheral device during a predetermined time period, transmission of the interrupts to the processor is inhibited during the predetermined time period and the interrupts are stored in a register of the peripheral device. After the predetermined time period, the processor reads a value of the register and executes corresponding ISRs. Further, the processor inhibits generation of the interrupts by the peripheral device for the predetermined time period after reading the register. However, this technique does not distinguish between real-time and non-real-time interrupts.

It would be advantageous to have a system that manages interrupts, and ensures completion of real-time programs uninterruptedly within a predetermined time period.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
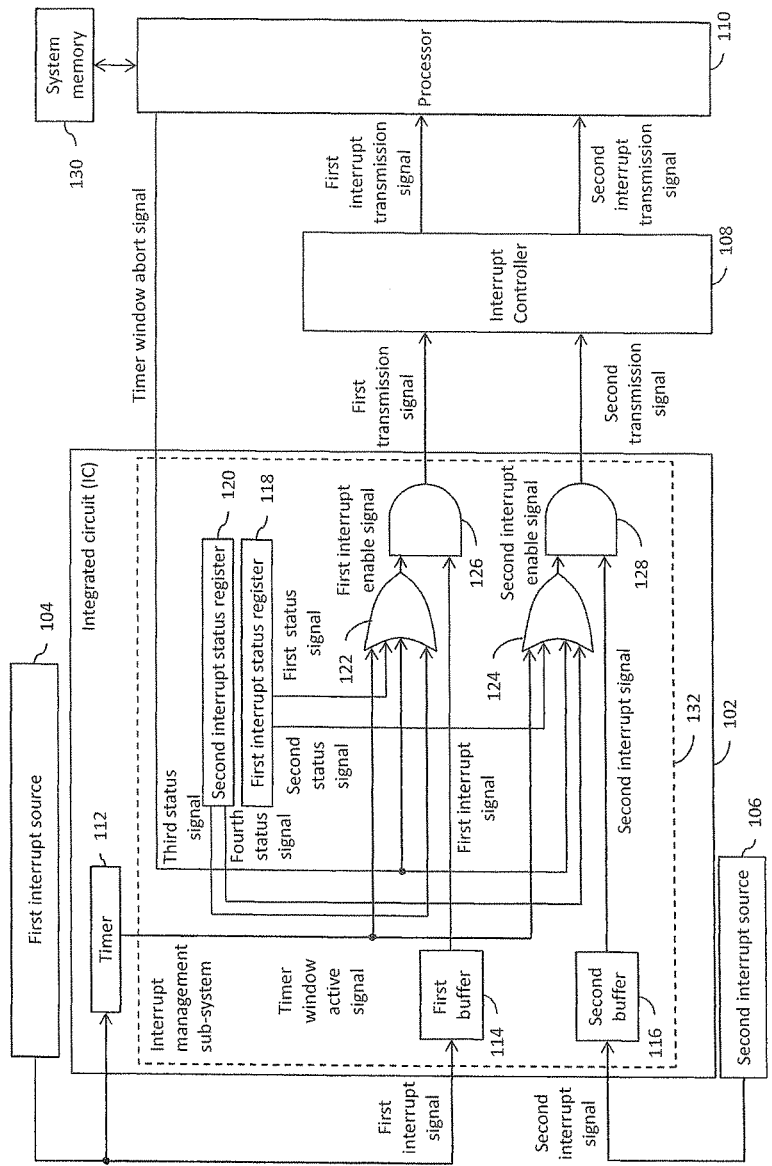
FIG. 1 is a schematic block diagram of an integrated circuit (IC) in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, an interrupt management system connected to an interrupt controller for managing a plurality of interrupts is provided. The interrupt management system comprises a timer and an interrupt management sub-system. The interrupt management sub-system receives the interrupts and determines if a first interrupt of the plurality of interrupts is a real-time interrupt and a second interrupt is a non-real-time interrupt. The interrupt management sub-system further determines if the second interrupt is one of a maskable and a non-maskable interrupt. The interrupt management sub-system initializes the timer for a predetermined time period based on the first interrupt, and transmits the first interrupt to the interrupt controller. The interrupt management sub-system en-queues the second interrupt during the predetermined time period when the second interrupt is a maskable interrupt and transmits the second interrupt to the interrupt controller when the second interrupt is a non-maskable interrupt.

In another embodiment of the present invention, a system for managing a plurality of interrupts is provided, where the interrupts include first and second interrupts. The system comprises a timer, a first interrupt status register, first through fourth logic gates, and an interrupt controller. The timer receives a first interrupt signal corresponding to the first interrupt and generates a timer window active signal after a predetermined time period. The first interrupt status register stores first and second status values and provides first and second status signals, respectively. A first logic state of the first status signal indicates that the first interrupt is a maskable interrupt. A second logic state of the first status signal indicates that the first interrupt is a non-maskable interrupt. A first logic state of the second status signal indicates that the second interrupt is a maskable interrupt. A second logic state of the second status signal indicates that the second interrupt is a non-maskable interrupt. The first logic gate has first, second, and third input terminals for receiving the timer window active signal, the first status signal, a timer window abort signal, respectively. The first logic gate has an output terminal for generating a first interrupt enable signal. The second logic gate has first, second, and third input terminals for receiving the timer window active signal, the second status signal, the timer window abort signal, respectively. The second logic gate has an output terminal for generating a second interrupt enable signal. The third logic gate has first and second input terminals for receiving the first interrupt signal and the first interrupt enable signal, respectively. The third logic gate has an output terminal for generating a first transmission signal. The fourth logic gate has first and second input terminals for receiving a second interrupt signal corresponding to the second interrupt and the second interrupt enable signal, respectively. The fourth logic gate has an output terminal for generating a second transmission signal. The interrupt controller receives the first and second transmission signals and generates first and second interrupt transmission signals, respectively.

In yet another embodiment of the present invention, a method for managing a plurality of interrupts is provided. The method includes receiving the interrupts, where a first interrupt is determined to be a real-time interrupt and a second interrupt is determined to be a non-real-time interrupt. The second interrupt is determined to be at least one of a maskable interrupt and a non-maskable interrupt. The method further includes initializing a timer for a predetermined time period based on the first interrupt and transmitting the first interrupt. The second interrupt is queued during the predetermined time period when the second interrupt is a maskable interrupt. The second interrupt is transmitted when the second interrupt is a non-maskable interrupt.

Various embodiments of the present invention provide an interrupt management system connected to an interrupt controller for managing a plurality of interrupts. The interrupt management system is connected between the interrupt controller and peripheral devices. The interrupt management system comprises a timer and an interrupt management sub-system. The interrupt management sub-system receives the plurality of interrupts. The interrupt management sub-system determines a first interrupt of the plurality of interrupts to be a real-time interrupt. The interrupt management sub-system determines a second interrupt of the plurality of interrupts to be a non-real-time interrupt. The interrupt management sub-system further determines the second interrupt to be at least one of a maskable interrupt and a non-maskable interrupt. The interrupt management sub-system initializes the timer for a predetermined time period based on the first interrupt. The interrupt management sub-system transmits the first interrupt to the interrupt controller. The interrupt management sub-system en-queues the second interrupt during the predetermined time period when the second interrupt is a maskable interrupt and transmits the second interrupt to the interrupt controller when the second interrupt is a non-maskable interrupt.

The timer generates a timer window active signal. The timer window active signal is active during the predetermined time period and is inactive after the predetermined time period. Hence, the interrupt management system transmits the real-time interrupt to a processor. The interrupt management system en-queues the maskable interrupts during the predetermined time period. Further, the interrupt management system de-queues the maskable interrupts and transmits the maskable interrupts to the processor after the predetermined time period. The processor receives the real-time interrupt and executes a real-time program corresponding to the real-time interrupt. The real-time program includes an interrupt service routine (ISR) corresponding to the real-time interrupt and a non-ISR program corresponding to the real-time interrupt. In an example, the predetermined time period equals a time required to execute the real-time program. Hence, the interrupt management system masks the maskable interrupts during the predetermined time period, thereby preventing the maskable interrupts from interrupting the processor during the execution of the real-time program and ensuring the completion of the execution of the real-time program within the predetermined time period.

Hence, the interrupt management system en-queues the maskable interrupts when the timer window active signal is active and de-queues the maskable interrupts when the timer window active signal is inactive.

Further, the processor generates the timer window abort signal after executing the real-time program during the predetermined time period. The interrupt management system receives the timer window abort signal and de-queues the maskable interrupts based on the timer window abort signal. The processor then receives the maskable interrupt and executes ISRs corresponding to the maskable interrupts. Hence, the interrupt management system improves the efficiency of the processor by ensuring an uninterrupted execution of the real-time program within the predetermined time period. Further, the interrupt management system allows run time configurability, i.e., the interrupt management system allows an operator to modify a value of the predetermined time period by way of the processor.

Referring now to FIG. 1, a schematic block diagram of an integrated circuit (IC) 102 in accordance with an embodiment of the present invention is shown. The IC 102 is connected to first and second interrupt sources 104 and 106, an interrupt controller 108, and a processor 110. The IC 102 includes a timer 112, first and second buffers 114 and 116, first and second interrupt status registers 118 and 120, and first through fourth logic gates 122-128. The processor 110 is connected to a system memory 130. The first and second interrupt status registers 118 and 120, the first and second buffers 114 and 116, and the first through fourth logic gates 122-128 form an interrupt management sub-system 132. Examples of the first and second interrupt sources 104 and 106 include peripheral devices and co-processors. Examples of the peripheral devices include a universal serial bus (USB) port, a universal asynchronous receiver/transmitter (UART), and a serial peripheral interface (SPI) bus.

The first and second interrupt sources 104 and 106 generate first and second interrupt signals indicative of the first and second interrupts, respectively. The IC 102 receives the first and second interrupts and determines the first and second interrupts to be at least one of a real-time interrupt and a non-real-time interrupt. A real-time interrupt is a time-critical interrupt. Generally, the real-time interrupt is a high-priority interrupt and requires to be serviced within a predetermined time period. Further, the IC 102 determines each non-real-time interrupt to be at least one of a maskable interrupt and a non-maskable interrupt. A maskable interrupt is a low priority interrupt and a non-maskable interrupt is a high-priority interrupt. In an example, a non-maskable interrupt has higher priority than a real-time interrupt, and hence, servicing of the non-maskable interrupt cannot be delayed. However, the maskable interrupt can be en-queued and servicing of the maskable interrupt can be delayed. Examples of the first and second interrupts include hardware interrupts and software interrupts. In another example, the first interrupt is a real-time interrupt and the second interrupt is a non-real-time interrupt.

The timer 112 is connected to the first interrupt source 104 for receiving the first interrupt signal. In an example, the timer 112 is connected to at least one of the first and second interrupt sources 104 and 106. The timer 112 includes an internal memory (not shown) for storing a programmed timer value. The timer 112 generates a timer window active signal based on the first interrupt signal after a predetermined time period corresponding to the programmed timer value. The timer window active signal is at a first logic state during the predetermined time period and at a second logic state after the predetermined time period. The first logic state of the timer window active signal indicates that the timer window active signal is active and the second logic state of the timer window active signal indicates that the timer window active signal is inactive. In an example, the processor 110 enables an operator to modify the programmed timer value stored in the internal memory during run time, thereby providing run time configurability. In another example, the timer 112 includes a decrementer (not shown) connected to the internal memory. The decrementer receives a clock signal (not shown). Initially, the decrementer stores the programmed timer value in the internal memory. The decrementer decrements the programmed timer value at each active clock edge of the clock signal. Examples of the active clock edge include rising and falling edges of the clock signal. Further, the timer 112 generates the timer window active signal at the second logic state, i.e., the timer 112 deactivates the timer window active signal when the decremented programmed timer value reaches zero. The timer 112 then re-initializes the decrementer based on the first interrupt signal by storing the programmed timer value in the internal memory.

The first and second buffers 114 and 116 are connected to the first and second interrupt sources 104 and 106 for receiving, storing, and providing the first and second interrupt signals, respectively. The first and second buffers 114 and 116 are physical memory devices, examples of which include a random access memory (RAM), a hard-drive, and a cache memory. In an example, the first and second buffers 114 and 116 are first-in-first-out buffers. Hence, the first and second buffers 114 and 116 en-queue and de-queue the first and second interrupt signals, respectively.

The first interrupt status register 118 stores first and second status values corresponding to the first and second interrupts, respectively. The first status value indicates whether the first interrupt is a maskable interrupt or a non-maskable interrupt. The second status value indicates whether the second interrupt is a maskable interrupt or a non-maskable interrupt. The first interrupt status register 118 provides first and second status signals corresponding to the first and second status values, respectively. A first logic state of the first status signal indicates that the first interrupt is a maskable interrupt and a second logic state of the first status signal indicates that the first interrupt is a non-maskable interrupt. A first logic state of the second status signal indicates that the second interrupt is a maskable interrupt and a second logic state of the second status signal indicates that the second interrupt is a non-maskable interrupt. In an example, the processor 110 allows an operator to store the first and second status values in the first interrupt status register 118 during run time.

The second interrupt status register 120 stores third and fourth status values corresponding to the first and second interrupts, respectively. The third status value indicates whether the first interrupt is a real-time interrupt or a non-real-time interrupt. The fourth status value indicates whether the second interrupt is a real-time interrupt or a non-real-time interrupt. The second interrupt status register 120 provides third and fourth status signals corresponding to the third and fourth status values, respectively. A first logic state of the third status signal indicates that the first interrupt is a non-real-time interrupt and a second logic state of the third status signal indicates that the first interrupt is a real-time interrupt. A first logic state of the fourth status signal indicates that the second interrupt is a non-real-time interrupt and a second logic state of the fourth status signal indicates that the second interrupt is a real-time interrupt. In an example, the processor 110 allows the operator to store the third and fourth status values in the second interrupt status register 120 during run time.

Hence, the processor 110 facilitates the operator to program the first and second interrupts to be at least one of a maskable interrupt and a non-maskable interrupt by storing the first and second status values in the first interrupt status register 118. Similarly, the processor 110 facilitates the operator to program the first and second interrupts to be at least one of a real-time interrupt and a non-real-time interrupt by storing the third and fourth status values in the second interrupt status register 120.

The first logic gate 122 has a first input terminal connected to the timer 112 for receiving the timer window active signal, a second input terminal connected to the first interrupt status register 118 for receiving the first status signal, a third input terminal connected to the processor 110 for receiving a timer window abort signal, a fourth input terminal connected to the second interrupt status register 120 for receiving the third status signal, and an output terminal for generating a first interrupt enable signal.

The second logic gate 124 has a first input terminal connected to the timer 112 for receiving the timer window active signal, a second input terminal connected to the first interrupt status register 118 for receiving the second status signal, a third input terminal connected to the processor 110 for receiving the timer window abort signal, a fourth input terminal connected to the second interrupt status register 120 for receiving the fourth status signal, and an output terminal for generating a second interrupt enable signal. In an example, the first and second logic gates 122 and 124 are OR gates.

The third logic gate 126 has a first input terminal connected to the first buffer 114 for receiving the first interrupt signal, a second input terminal connected to the output terminal of the first logic gate 122 for receiving the first interrupt enable signal, and an output terminal for generating a first transmission signal corresponding to the first interrupt. The third logic gate 126 transmits the first transmission signal to the interrupt controller 108, thereby transmitting the first interrupt to the interrupt controller 108.

The fourth logic gate 128 has a first input terminal connected to the second buffer 116 for receiving the second interrupt signal, a second input terminal connected to the output terminal of the second logic gate 124 for receiving the second interrupt enable signal, and an output terminal for generating a second transmission signal corresponding to the second interrupt. The fourth logic gate 128 transmits the second transmission signal to the interrupt controller 108, thereby transmitting the second interrupt to the interrupt controller 108. In an example, the third and fourth logic gates 126 and 128 are AND gates.

The interrupt controller 108 receives the first and second transmission signals and generates first and second interrupt transmission signals. The first and second interrupt transmission signals correspond to the first and second interrupts, respectively.

The system memory 130 is connected to the processor 110. The system memory 130 stores first and second programs corresponding to the first and second interrupts, respectively. The first program includes a first ISR corresponding to the first interrupt and a first non-ISR program corresponding to the first interrupt. The second program includes a second ISR corresponding to the second interrupt and a second non-ISR program corresponding to the second interrupt. An ISR is a computer readable program code executed by the processor 110 when the processor 110 receives an interrupt.

The processor 110 receives the first and second interrupt transmission signals and retrieves the first and second programs from the system memory 130. The processor 110 then executes the first and second programs. In the example, the first interrupt is a real-time interrupt and the second interrupt is a non-real-time interrupt, the IC 102 generates the first transmission signal and initializes the timer 112 for the predetermined time period based on the first interrupt signal. The interrupt controller 108 receives the first transmission signal and transmits the first interrupt transmission signal to the processor 110. The processor 110 receives the first interrupt transmission signal and executes the first program, i.e., the processor 110 executes the first ISR and the first non-ISR program. The processor 110 generates the timer window abort signal at the second logic state after completion of the execution of the first program during the predetermined time period, i.e., the processor 110 activates the timer window abort signal after completion of the execution of the first program during the predetermined time period. Hence, the second logic state of the timer window abort signal indicates that the timer window abort signal is active and a first logic state of the timer window abort signal indicates that the timer window abort signal is inactive. The timer window abort signal is indicative of de-queuing the second interrupt signal. The IC 102 receives the timer window abort signal at the second logic state and transmits the second transmission signal to the interrupt controller 108. The interrupt controller 108 receives the second transmission signal and generates and transmits the second interrupt transmission signal. Thereafter, the processor 110 receives the second interrupt transmission signal, retrieves and executes the second program.

Therefore, the interrupt management sub-system 132 receives the first and second interrupt signals and determines whether the first and second interrupts are real-time interrupts or non-real-time interrupts. For non-real-time interrupts, the interrupt management sub-system 132 determines whether the non-real-time interrupt is a maskable interrupt or a non-maskable interrupt.

In an example, the interrupt management sub-system 132 determines the first interrupt to be a real-time interrupt and the second interrupt to be a non-real-time interrupt. Further, the interrupt management sub-system 132 determines the second interrupt to be at least one of a maskable interrupt and a non-maskable interrupt. The interrupt management sub-system 132 initializes the timer 112 for the predetermined time period based on the first interrupt signal. The timer 112 generates the timer window active signal after the predetermined time period. In an example, the timer window active signal is active during the predetermined time period and is inactive after the predetermined time period.

Further, the interrupt management sub-system 132 transmits the first interrupt to the interrupt controller 108. The interrupt management sub-system 132 en-queues the second interrupt signal during the predetermined time period when the second interrupt is a maskable interrupt and transmits the second interrupt to the interrupt controller 108 during the predetermined time period when the second interrupt is a non-maskable interrupt. Further, the interrupt management sub-system 132 transmits the second interrupt to the interrupt controller 108 after the predetermined time period when the second interrupt is a maskable interrupt. Hence, the interrupt management sub-system 132 de-queues the second interrupt and transmits the second interrupt to the interrupt controller 108 based on the timer window abort signal.

In an example, the IC 102 includes a first set of timers (not shown) including the timer 112. The interrupt management sub-system 132 receives multiple interrupt signals corresponding to multiple interrupts including first and second sets of interrupts. The first set of interrupts includes the first interrupt and the second set of interrupts includes the second interrupt. The IC 102 determines the first set of interrupts to be real-time interrupts and the second set of interrupts to be non-real-time interrupts. The interrupt management sub-system 132 initializes the first set of timers based on the first set of interrupts, i.e., each timer of the first set of timers corresponds to an interrupt of the first set of interrupts. Each timer generates corresponding timer window active signal after corresponding predetermined time period. The interrupt management sub-system 132 generates and transmits a first set of transmission signals corresponding to the first set of interrupts to the interrupt controller 108. The interrupt management sub-system 132 determines each interrupt of the second set of interrupts to be at least one of a maskable interrupt and a non-maskable interrupt. The interrupt management sub-system 132 en-queues an interrupt of the second set of interrupts when the interrupt is a maskable interrupt and transmits the interrupt to the interrupt controller 108 when the interrupt is a non-maskable interrupt. Further, the interrupt management sub-system 132 generates and transmits a second set of transmission signals corresponding to the second set of interrupts to the interrupt controller 108 based on the timer window abort signal. The first and second sets of transmission signals include the first and second transmission signals, respectively.

Figure 2:
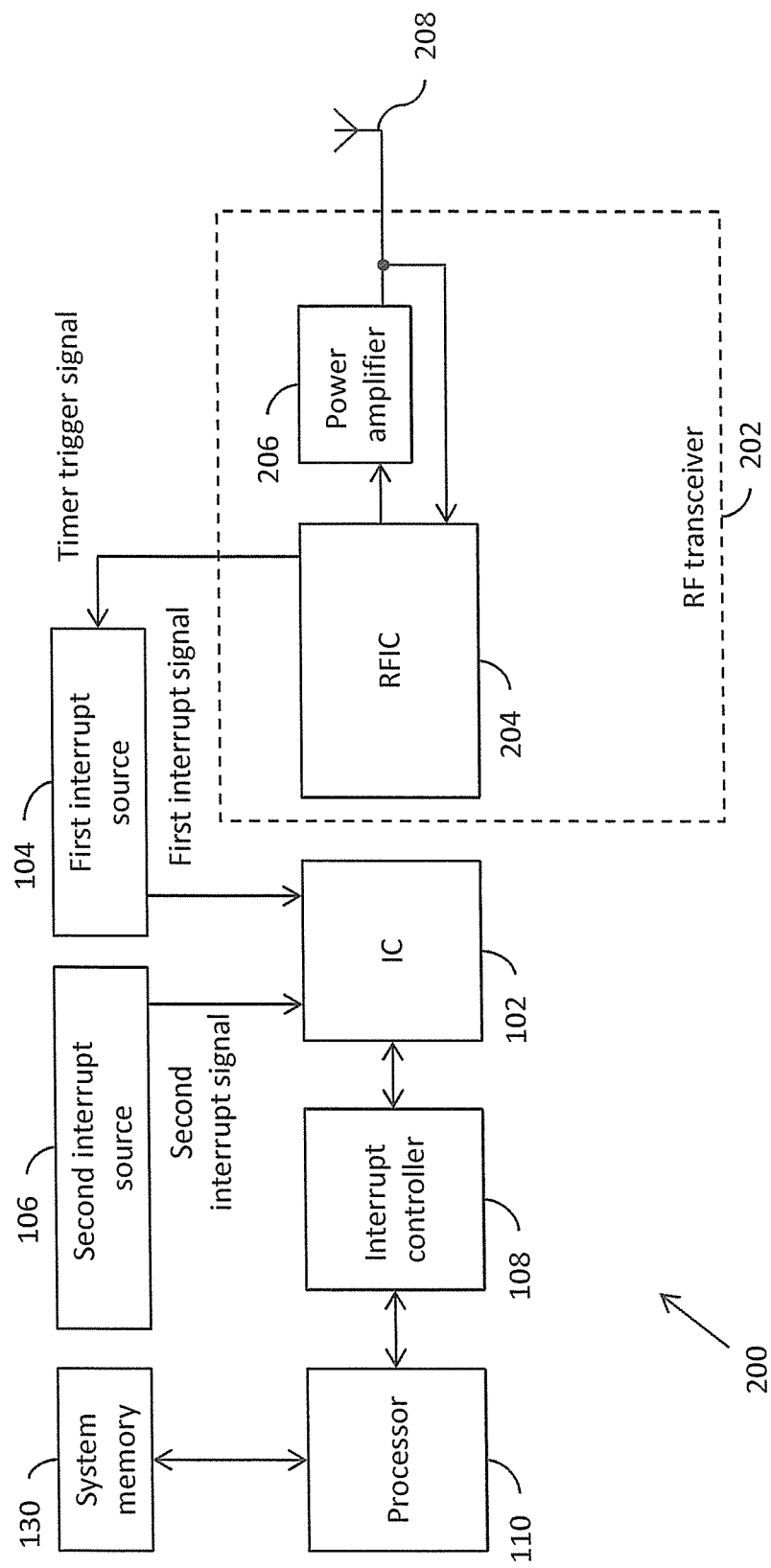
FIG. 2 is a schematic block diagram of a base transceiver station (BTS) in accordance with an embodiment of the present invention.

Referring now to FIG. 2, a schematic block diagram of a base transceiver station (BTS) 200 that includes the IC 102 in accordance with an embodiment of the present invention is shown. The BTS 200 further includes the first and second interrupt sources 104 and 106, the interrupt controller 108, the processor 110, the system memory 130, and a radio-frequency (RF) transceiver 202. The RF transceiver 202 includes a radio-frequency interface controller (RFIC) 204, a power amplifier 206, and an antenna 208. The BTS 200 is included in an RF communication network (not shown). In an example, the BTS 200 is an eNode-B of a long term evolution (LTE) based RF communication system. The BTS 200 communicates with multiple user equipments (UEs) (not shown) in the RF communication network by way of RF signals. The transmission of the RF signals from a UE to the BTS 200 is referred to as uplink communication and the transmission of the RF signals from the BTS 200 to the UE is referred to as downlink communication.

The antenna 208 is connected to the power amplifier 206 and the RFIC 204. The RFIC 204 is connected to the power amplifier 206 and the first interrupt source 104. During the uplink communication, the antenna 208 receives an RF signal from the UE and transmits the RF signal to the RFIC 204. The RFIC 204 receives the RF signal and generates a digital baseband signal. The RFIC 204 transmits the digital baseband signal to the processor 110. The processor 110 processes the digital baseband signal and retrieves information from the digital baseband signal.

During the downlink communication, the processor 110 generates the digital baseband signal and transmits the digital baseband signal to the RFIC 204. The RFIC 204 generates an analog RF signal based on the digital baseband signal. The power amplifier 206 receives and amplifies the analog RF signal to generate an amplified analog RF signal. The antenna 208 transmits the amplified analog RF signal to the UE by way of free space. In an example, the processor 110 performs layer-2 processing of a wireless protocol stack. In a preferred embodiment, the processor 110 is a layer-2 processor.

In an embodiment, the RFIC 204 generates a timer trigger signal. The first interrupt source 104 receives the timer trigger signal and generates the first interrupt signal (also referred to as "transmission time interval (TTI) interrupt signal"). In an example, the first interrupt source 104 is an antenna interface controller (AIC). The IC 102 receives the TTI interrupt signal and initializes the timer 112. The TTI interrupt signal is a periodic and real-time interrupt signal. A time period of the TTI interrupt signal equals duration of a sub-frame in the LTE based RF communication system. The time period of the TTI interrupt signal is duration between two successive occurrences of the TTI interrupt signal. In an example, the time period of the TTI interrupt signal is 1 millisecond (ms).

Hence, the IC 102 en-queues the maskable interrupts during the predetermined time period and de-queues the maskable interrupts after the predetermined time period. In an example, the predetermined time period equals a time required to execute a real-time program corresponding to the real-time interrupt. Therefore, the IC 102 masks the maskable interrupts during the predetermined time period and allows the real-time interrupts and non-maskable interrupts during the predetermined time period, thereby preventing the maskable interrupts from interrupting the processor 110 during the execution of the real-time program. Hence, the IC 102 ensures the completion of the execution of the real-time program within the predetermined time period, thereby increasing efficiency of the processor 110. The IC 102 allows the operator to modify a value of the predetermined time period by way of the processor 110, thereby providing run time configurability. The IC 102 allows the operator to program the first and second interrupts to be at least one of a maskable interrupt and a non-maskable interrupt by way of the first interrupt status register 118. Further, the IC 102 allows the operator to program the first and second interrupts to be at least one of a real-time interrupt and a non-real-time interrupt by way of the second interrupt status register 120.

Figure 3:
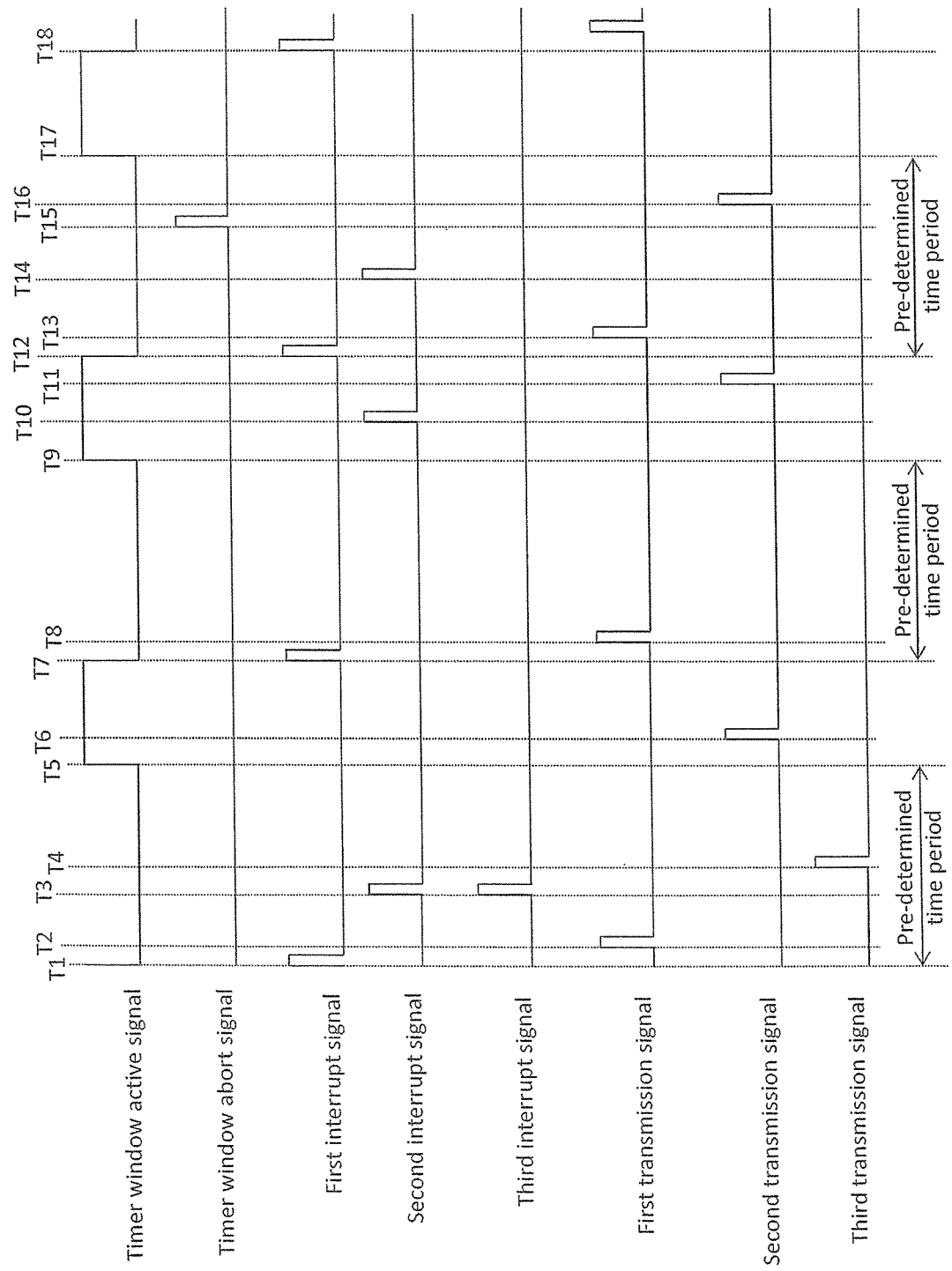
FIG. 3 is a timing diagram illustrating operation of the IC of FIG. 1 in accordance with an embodiment of the present invention.
Figure 4A:
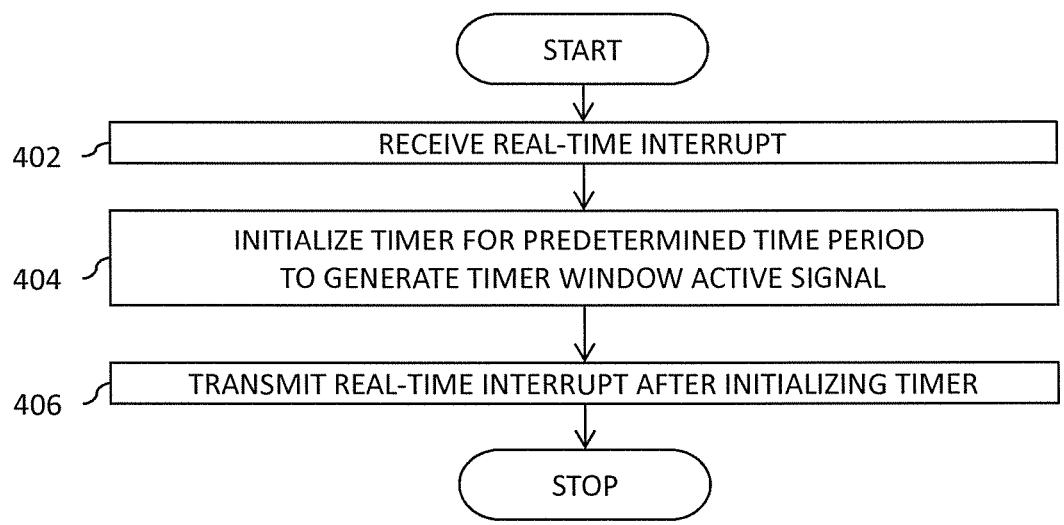
FIGS. 4A-4E are a flow chart illustrating a method for managing interrupts in accordance with an embodiment of the present invention.
Figure 4B:
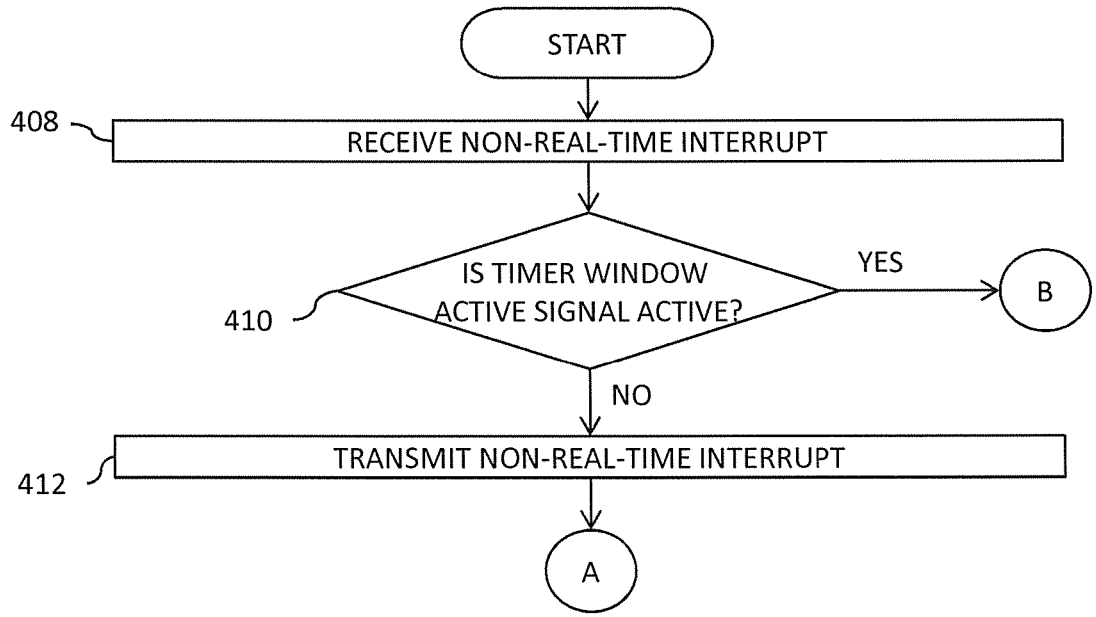
Figure 4C:
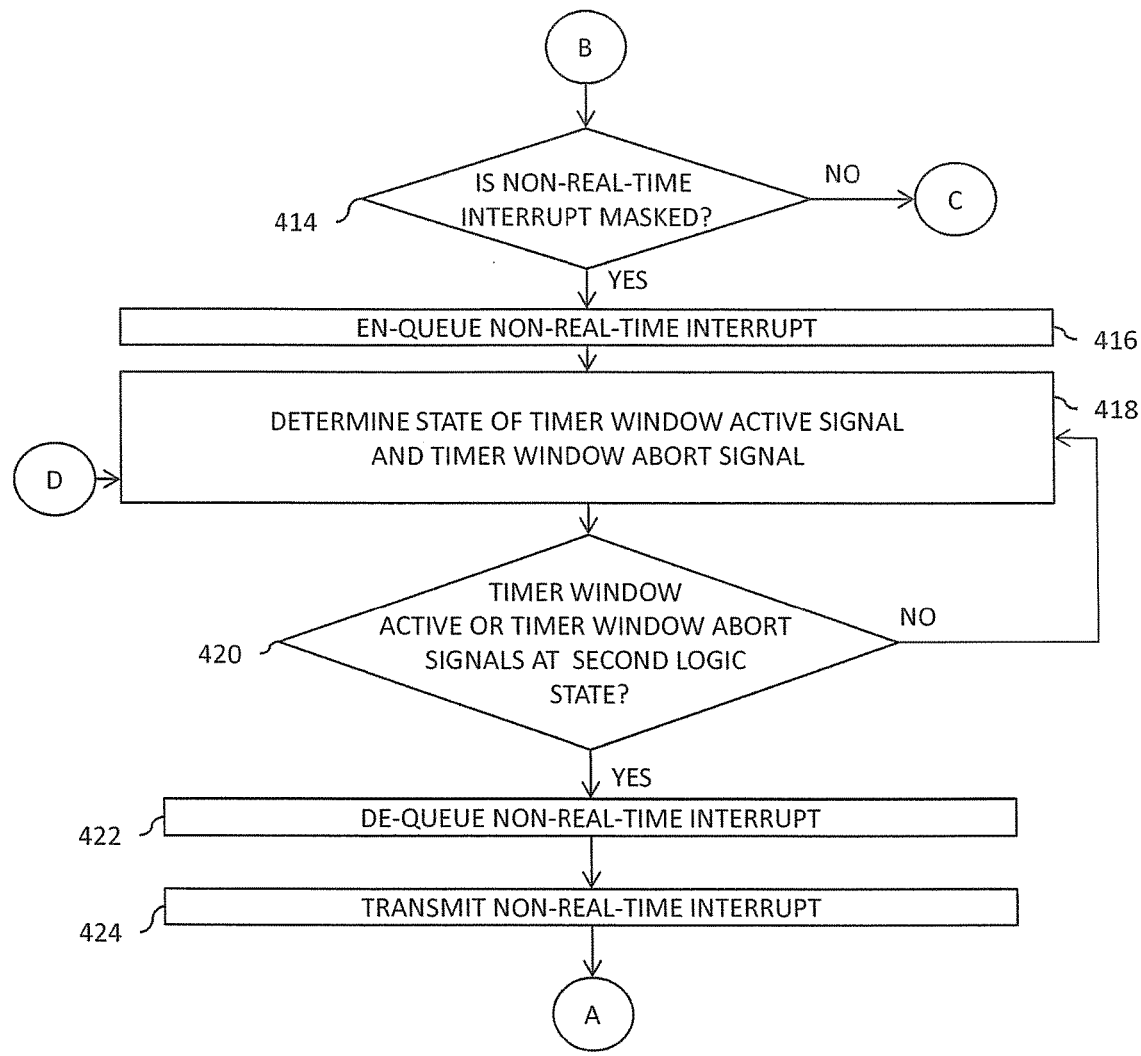
Figure 4D:
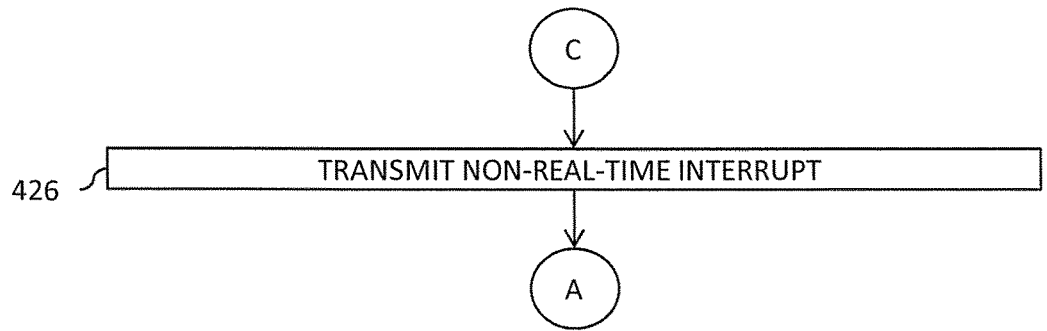
Figure 4E:
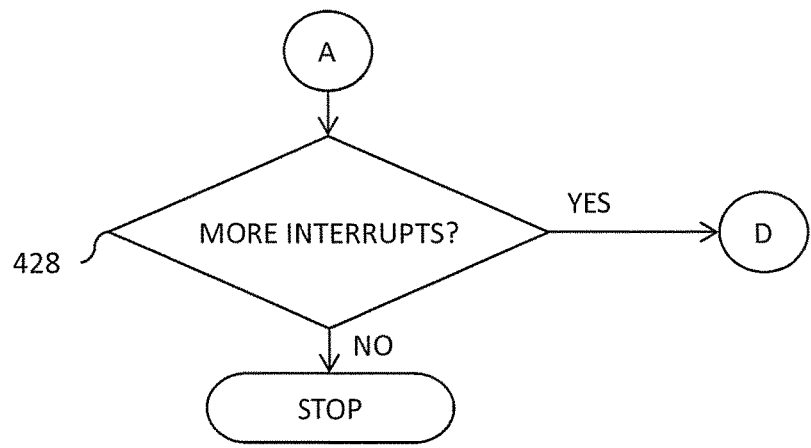

Referring now to FIG. 3, a timing diagram illustrating functioning of the IC 102 in accordance with an embodiment of the present invention is shown.

In an example, the first logic state of the timer window active signal is logic low state and the second logic state of the timer window active signal is logic high state. Thus, the timer window active signal is active when the timer window active signal is at logic low state and is inactive when the timer window active signal is at logic high state. At time instance T1, the IC 102 receives the first interrupt signal at logic high state. The IC 102 determines the first interrupt to be a real-time interrupt. The IC 102 initializes the timer 112 for a time period T1-T5 based on the logic high state of the first interrupt signal. The timer 112 generates the timer window active signal at logic low state during the time period T1-T5 and at logic high state after time instance T5, i.e, the timer 112 activates the timer window active signal during the time period T1-T5 and deactivates the timer window active signal after time instance T5. At time instance T2, the IC 102 generates the first transmission signal at logic high state based on the logic high state of the first interrupt signal. The IC 102 transmits the first transmission signal to the interrupt controller 108. At time instance T3, the IC 102 receives the second interrupt signal at logic high state corresponding to the second interrupt and a third interrupt signal at logic high state corresponding to a third interrupt. The IC 102 determines the second and third interrupts to be non-real-time interrupts. Further, the IC 102 determines the second interrupt to be a maskable interrupt and the third interrupt to be a non-maskable interrupt. At time instance T4, the IC 102 generates a third transmission signal corresponding to the third interrupt at logic high state based on the logic high state of the third interrupt signal. The IC 102 transmits the third transmission signal to the interrupt controller 108. At time instance T5, the timer 112 deactivates the timer window active signal. At time instance T6, the IC 102 generates the second transmission signal at logic high state.

At time instance T7, the IC 102 receives the first interrupt signal at logic high state. The IC 102 initializes the timer 112 for a time period T7-T9 based on logic high state of first interrupt signal. The timer 112 activates the timer window active signal during the time period T7-T9 and deactivates the timer window active signal after time instance T9. At time instance T8, the IC 102 generates the first transmission signal at logic high state based on logic high state of the first interrupt signal. The IC 102 transmits the first transmission signal to the interrupt controller 108. At time instance T9, the timer 112 deactivates the timer window active signal. At time instance T10, the IC 102 receives the second interrupt signal at logic high state. At time instance T11, the IC 102 generates the second transmission signal at logic high state. The IC 102 transmits the second transmission signal to the interrupt controller 108.

At time instance T12, the IC 102 receives the first interrupt signal at logic high state. The IC 102 initializes the timer 112 for a time period T12-T17 based on logic high state of the first interrupt signal. The timer 112 activates the timer window active signal during the time period T12-T17 and deactivates the timer window active signal after time instance T17. At time instance T13, the IC 102 generates the first transmission signal at logic high state based on logic high state of the first interrupt signal. At time instance T14, the IC 102 receives the second interrupt signal at logic high state. At time instance T15, the processor 110 generates the timer window abort signal at logic high state, i.e., the processor 110 activates the timer window abort signal. Hence, at time instance T15, the IC 102 receives the timer window abort signal at logic high state. At time instance T16, the IC 102 generates the second transmission signal at logic high state. At time instance T17, the timer 112 deactivates the timer window active signal.

Referring now to FIGS. 4A-4E, a flowchart illustrating a method for managing the interrupts in accordance with an embodiment of the present invention is shown. The flowchart is explained in conjunction with FIG. 1.

At step 402, the IC 102 receives the first interrupt signal corresponding to the first interrupt. In an example, the first interrupt is the real-time interrupt. At step 404, the IC 102 initializes the timer 112 for the predetermined time period. The timer 112 generates the timer window active signal at second logic state after the predetermined time period, i.e., the timer 112 deactivates the timer window active signal after the predetermined time period. At step 406, the IC 102 transmits the first transmission signal to the interrupt controller 108, wherein the first transmission signal corresponds to the first interrupt.

At step 408, the IC 102 receives the second interrupt signal corresponding to the second interrupt. In the above example, the second interrupt is the non-real-time interrupt. At step 410, the IC 102 checks to determine whether the timer window active signal is active. If at step 410, the IC 102 determines that the timer window active signal is active, the IC 102 executes step 414. However, if at step 410, the IC 102 determines that the timer window active signal is inactive, the IC 102 executes step 412. At step 412, the IC 102 transmits the second transmission signal to the interrupt controller 108, wherein the second transmission signal corresponds to the second interrupt. The IC 102 executes step 428 after executing step 412.

At step 414, the IC 102 checks to determine whether the second interrupt is a maskable interrupt or a non-maskable interrupt. If at step 414, the IC 102 determines that the second interrupt is a maskable interrupt, the IC 102 executes step 416. However, if at step 414, the IC 102 determines that the second interrupt is non-maskable interrupt, the IC 102 executes step 426. At step 416, the IC 102 en-queues the second interrupt signal. At step 418, the IC 102 determines a state of the timer window active signal and the timer window abort signal. At step 420, the IC 102 checks to determine whether at least one of the timer window active signal and the timer window abort signal is at second logic state (i.e., one of the timer window active signal is inactive and the timer window abort signal is active). If at step 420, the IC 102 determines that one of the timer window active signal is inactive and the timer window abort signal is active, the IC 102 executes step 422. However, if at step 420, the IC 102 determines that one of the timer window active signal is active and the timer window abort signal is inactive, the IC 102 executes step 418. At step 422, the IC 102 de-queues the second interrupt signal. At step 424, the IC 102 transmits the second transmission signal to the interrupt controller 108. The IC 102 executes step 428 after executing step 424.

At step 426, the IC 102 transmits the second interrupt to the interrupt controller 108. The IC 102 executes step 428 after executing step 426.

At step 428, the IC 102 checks to determine whether there are any more interrupts. If at step 428, the IC 102 determines that there are more interrupts, the IC 102 executes step 418.

In an embodiment, a processor includes one or more software modules for performing the above steps. Further, it will be understood by those of skill in the art that any interrupt management system that performs the above steps for multiple interrupts will lie under the scope of the invention.

It will be understood by those of skill in the art that the same logical function may be performed by different arrangements of logic gates, or that logic circuits operate using either positive or negative logic signals. Therefore, variations in the arrangement of some of the logic gates described above should not be considered to depart from the scope of the present invention. No element, act, or instruction used in the present application should be construed as critical or essential to the invention unless explicitly described as such. Further, the phrase "based on" is intended to mean "based, at least in part, on" unless explicitly stated otherwise.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. An interrupt management system connected to an interrupt controller for managing a plurality of interrupts, the interrupt management system comprising:
   a timer; and
   an interrupt management sub-system, connected to the timer, and including first and second interrupt status registers, wherein the interrupt management sub-system is configured for:
      receiving the plurality of interrupts,
      determining a first interrupt of the plurality of interrupts to be a real-time interrupt and storing a first status value therefor in the first interrupt status register, determining a second interrupt of the plurality of interrupts to be a non-real-time interrupt and storing a second status value therefor in the first interrupt status register, determining the second interrupt to be at least one of a maskable interrupt and a non-maskable interrupt based on the second status value, determining a third interrupt of the plurality of interrupts to be one of a real-time interrupt and a non-real-time interrupt and storing a third status value therefor in the second interrupt status register, determining a fourth interrupt of the plurality of interrupts to be one of a real-time interrupt and a non-real-time interrupt and storing a fourth status value therefor in the second interrupt status register, initializing the timer for a predetermined time period based on the first interrupt, wherein the timer generates a timer window active signal after the predetermined time period, transmitting the first interrupt to the interrupt controller, queuing the second interrupt during the predetermined time period when the second interrupt is a maskable interrupt, and transmitting the second interrupt to the interrupt controller when the second interrupt is a non-maskable interrupt.

2. The interrupt management system of claim 1, wherein the interrupt management sub-system is further configured for transmitting the second interrupt to the interrupt controller after the predetermined time period based on the timer window active signal when the second interrupt is a maskable interrupt.

3. The interrupt management system of claim 1, wherein the interrupt management sub-system is further configured for receiving a timer window abort signal and transmitting the plurality of interrupts to the interrupt controller after receiving the timer window abort signal.

4. The interrupt management system of claim 3, wherein the timer generates a programmed timer value indicative of the predetermined time period.

5. The interrupt management system of claim 1, further comprising a first set of timers, including the timer, connected to the interrupt management sub-system.

6. The interrupt management system of claim 5, wherein the interrupt management sub-system is further configured for:

determining a first set of interrupts of the plurality of interrupts, including the first interrupt, to be real-time interrupts, and initializing the first set of timers based on the first set of interrupts, wherein each timer of the first set of timers corresponds to at least one real-time interrupt of the first set of interrupts.

7. The interrupt management system of claim 6, wherein each timer generates a corresponding timer window active signal after a corresponding predetermined time period.

8. A system for managing a plurality of interrupts, wherein the plurality of interrupts includes first and second interrupts, the system comprising:

a timer for receiving a first interrupt signal corresponding to the first interrupt and generating a timer window active signal after a predetermined time period;

a first interrupt status register for storing first and second status values, and providing first and second status signals, respectively, wherein a first logic state of the first status signal indicates that the first interrupt is a maskable interrupt and a second logic state of the first status signal indicates that the first interrupt is a non-maskable interrupt, a first logic state of the second status signal indicates that the second interrupt is a maskable interrupt, and a second logic state of the second status signal indicates that the second interrupt is a non-maskable interrupt;

a second interrupt status register that stores third and fourth status values and provides third and fourth status signals, respectively, wherein a first logic state of the third status signal indicates that the first interrupt signal is a real-time interrupt, and a second logic state of the third status signal indicates that the first interrupt signal is a non-real-time interrupt, and wherein a first logic state of the fourth status signal indicates that the second interrupt signal is a real-time interrupt, and a second logic state of the fourth status signal indicates that the second interrupt signal is a non-real-time interrupt;

a first logic gate having a first input terminal connected to the timer for receiving the timer window active signal, a second input terminal connected to the first interrupt status register for receiving the first status signal, a third input terminal for receiving a timer window abort signal, and an output terminal for generating a first interrupt enable signal;

a second logic gate having a first input terminal connected to the timer for receiving the timer window active signal, a second input terminal connected to the first interrupt status register for receiving the second status signal, a third input terminal for receiving the timer window abort signal, and an output terminal for generating a second interrupt enable signal;

a third logic gate having a first input terminal for receiving the first interrupt signal, a second input terminal connected to the output terminal of the first logic gate for receiving the first interrupt enable signal, and an output terminal for generating a first transmission signal;

a fourth logic gate having a first input terminal for receiving a second interrupt signal corresponding to the second interrupt, a second input terminal connected to the output terminal of the second logic gate for receiving the second interrupt enable signal, and an output terminal for generating a second transmission signal; and an interrupt controller connected to the third and fourth logic gates for receiving the first and second transmission signals, respectively, and generating first and second interrupt transmission signals, respectively.

9. The system of claim 8, wherein each of the first and second logic gates further includes a fourth input terminal connected to the second interrupt status register for receiving the third and fourth status signals, respectively.

10. The system of claim 9, wherein the timer generates the timer window active signal at a first logic state during the predetermined time period and at a second logic state after the predetermined time period.

11. The system of claim 9, further comprising:

a first buffer for receiving, storing, and transmitting the first interrupt signal, wherein the first input terminal of the third logic gate is connected to the first buffer for receiving the first interrupt signal; and a second buffer for receiving, storing, and transmitting the second interrupt signal, wherein the first input terminal of the fourth logic gate is connected to the second buffer for receiving the second interrupt signal.

* * * * *